United States Patent [19]

Hollis

[11] Patent Number: 5,157,109
[45] Date of Patent: Oct. 20, 1992

[54] PREPARATION OF NOVEL SYNTHETIC RESINS

[75] Inventor: Samuel D. Hollis, Savannah, Ga.

[73] Assignee: Union Camp Corporation, Wayne, N.J.

[21] Appl. No.: 481,136

[22] Filed: Feb. 16, 1990

[51] Int. Cl.$^5$ .................... C08L 23/00; C08L 93/04
[52] U.S. Cl. .................... 530/200; 530/230; 524/270; 524/272; 524/274
[58] Field of Search ............... 530/200, 230; 524/270, 524/272, 274

[56] References Cited

U.S. PATENT DOCUMENTS 5,026,753 6/1991 West et al. .................... 524/270

Primary Examiner—John Kight, III
Assistant Examiner—D. Truong
Attorney, Agent, or Firm—William K. Wissing

[57] ABSTRACT

A process for the preparation of novel resin comprising reacting cyclopentadienes, preferably dicyclopentadienes, with tall oil pitch or a neutrals-containing component thereof, at a temperature between about 200° C. and about 300° C. is described. The use of the resin in inks and coatings and the like is also discussed.

12 Claims, No Drawings

PREPARATION OF NOVEL SYNTHETIC RESINS

BACKGROUND OF THE INVENTION

The present invention relates to new synthetic resin compositions prepared by reacting cyclopentadienes with tall oil pitch or a neutrals-containing component thereof, and to methods of using the same in coatings, inks and the like.

Tall oil is a by-product of the pulping process. This by-product can be further refined, that is, separated into its component parts, by a process of fractional distillation, such as is described in *Tall Oil*, J. Drew and M. Post, eds., pp. 87–97, Pulp Chemical Association (1981). A wide variety of process systems and conditions have been employed by the art in carrying out this distillation. Sisson et al., U.S. Pat. No. 2,894,880, for example, describes in detail the fractional distillation of tall oil using a combination of distillation towers and falling film reboilers.

The literature is replete with publications describing the reaction of refined tall oil, and the tall oil fatty acid and tall oil rosin chemical constituents thereof, with dicyclopentadiene or similar monomers to produce synthetic resin precursors. Peters, U.S. Pat. Nos. 2,598,424 and 2,598,425, for example, discuss a process for the preparation of resinous material comprising reacting dicyclopentadiene with refined tall oil and tall oil rosin. Malatesta, U.S. Pat. No. 4,292,221, describes the copolymerization of tall oil fatty acid with dicyclopentadiene in the production of resins useful in inks. Laurito, U.S. Pat. Nos. 4,443,100, 4,189,410 and 4,056,498, disclose the reaction of distilled tall oil with dicyclopentadiene to produce ink resins.

Another important co-product of the distillation of tall oil is tall oil pitch. Sisson et al., U.S. Pat. No. 2,894,880, obtains a high grade of tall oil pitch melting at 40° C. which represents 17% of tall oil feed. Tall oil pitch is described in detail in *Kirk-Othmer Encyclopedia of Chemical Technology*, H. Mark, J. McKetter and D. Othmer, eds., Vol. 19, pp. 614–619 (2nd ed. 1969). A thorough analysis of tall oil pitch is also provided in Era et al., *J. Amer. Oil Chem. Soc.*, Vol. 56, pp. 992–994 (1979), and Holmbom et al., *J. Amer. Oil Chem. Soc.*, Vol. 55, pp. 342–344 (1978). In Holmbom et al., *J. Amer. Oil Chem. Soc.*, Vol. 55, pp. 342–344 (1978), at page 342, an analysis of untreated tall oil pitch from different Finnish and American sources is reported. This analysis reads as follows:

| Properties of Tall Oil Pitch Grades | | | | | | |
|---|---|---|---|---|---|---|
| | GRADE | | | | | |
| | A | B | C | D | E | F |
| Yield, of crude tall oil (%) | 25 | 25 | 25 | 30 | 20 | 20 |
| Acid number (mg KOH/g) | 34 | 49 | 38 | 39 | 30 | 27 |
| Saponification number (mg KOH/g) | 94 | 115 | 111 | 105 | 106 | 101 |
| Softening point (°C.) | 46 | 30 | 25–30 | 36 | — | — |
| Resin Acids (%) | 13 | 17 | 16 | 11 | 9 | 11 |
| Insolubles in petroleum ether (%) | 2 | 7 | 10 | 10 | 9 | 0.4 |

This publication also notes that these six grades contain 34.6 to 51.6% free acids, the balance being neutral pitch consisting of esterified acids and unsaponifiable neutral compounds. In Era et al., *J. Amer. Oil Chem. Soc.*, Vol. 56, pp. 992–994 (1979), the authors state that the ash content of six different tall oil pitch samples from Finnish and American sources range from about 0.1 to 1.4%.

Tall oil pitch has long been recognized in the industry as a most useful reagent in the preparation of valuable products and derivatives. Speck et al., U.S. Pat. No. 3,238,164, for example, illustrates the use of tall oil pitch in the preparation of pitch esters. D'Agostino, U.S. Pat. No. 3,445,409, describes the use of tall oil pitch in epoxy coatings. Szita, U.S. Pat. No. 4,337,193, discusses additives which increase the hardness of tall oil pitch, making the pitch useful in coating compositions.

New and/or better uses for tall oil pitch are being sought. The present invention is directed to this end.

SUMMARY OF THE INVENTION

It has now been discovered that tall oil pitch will react with cyclopentadienes, at a temperature in the range of about 200° C. to about 300° C., to produce novel resins which are useful in coatings and inks.

It has further been discovered that the neutrals which comprise a major portion of tall oil pitch will also react with cyclopentadienes, at a temperature in the range of about 200° C. to about 300° C., to produce novel resins which are also useful in coatings and inks.

DETAILED DESCRIPTION OF THE INVENTION

The novel resins of the present invention are produced by a process comprising reacting cyclopentadienes with tall oil pitch or a neutrals-containing component thereof at a temperature between about 200° C. and about 300° C.

As used herein with respect to the process of the invention, the term "cyclopentadienes", denotes substituted and unsubstituted cyclopentadiene (such as, for example, methyl- cyclopentadiene and dimethylcyclopentadiene), as well as dimers, codimers and oligomers thereof (such as, for example, dicyclopentadiene). Cyclopentadienes consist of compounds which are known per se.

Dicyclopentadiene, a compound of the formula

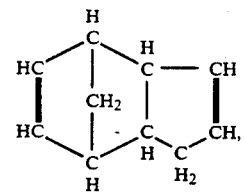

is the preferred cyclopentadiene employed. In practicing the preferred embodiment of the present invention, dicyclopentadiene may be used in substantially pure form, e.g., about 95% to about 100% dicyclopentadiene. Alternatively, dicyclopentadiene may be added as a mixture of hydrocarbons. Such hydrocarbon mixtures may include other cyclopentadienes, such as unsubstituted cyclopentadiene, methylcyclopentadiene, dimethylcyclo-pentadiene, and various dimers, codimers and oligomers thereof. Such mixtures may also contain conjugated acyclic diolefins such as isoprene, piperylene, their dimers and codimers plus various aliphatic and aromatic monoolefins. Other hydrocarbon constituents may also be present in the mixture, so long as they do not materially affect the process of the invention. If mixtures of dicyclopentadiene and other hydrocarbons are employed, it is most preferable that the dicyclopentadiene component comprise at least about 70% by weight of the total mixture. Suitable commercially available sources of dicyclopentadiene include Dicyclopentadiene Concentrate (Inhibited) TM, a product of Lyondell Petrochemical Company, a division of Atlantic Richfield Company, which has the following typical composition in weight percent: 70 to 80% dicyclopentadiene; 5 to 20% isoprene-cyclopentadiene dimer; 2 to 8% tricyclopentadiene; 2 to 8% isoprene dimer, fenchene-isopinene; 1 to 5%; piperylenecydopentadiene dimer; 0 to 5% $C_6$ hydrocarbons (other than benzene); 0.1% benzene; and 25 to 100 ppm butylated hydroxytoluene.

The phrase "tall oil pitch", as used herein with respect to the process of the invention, denotes the generally non-distillable or non-volatile portion (or bottom fraction or residue, as it is often termed), that remains after the conventional distillation of fatty acid, rosin acid and distillable neutral fractions from the tall oil. It is generally a tarry, dark brown substance, the specific characteristics of which vary somewhat depending upon such factors as the composition of the crude tall oil and the degree of distillation. Tall oil pitch is commercially available, for example, from Union Camp under the trademark Unitol DP-6.

As is well known in the industry, tall oil is a by-product of the sulfate (kraft) pulping process wherein coniferous woods, such as the jack pine, are cooked using sodium sulfide-sulfate-alkaline cooking liquors. As a result of the cooking procedure, a "soap" is formed that comprises a mixture of saponified fatty and resin acids and unsaponifiables which are then recovered from the spent cooking liquor as "skimmings". The skimmings are acidified and recovered as so-called tall oil. Tall oil, and the production thereof, is further described in *Tall Oil*, J. Drew and M. Post, eds., pp. 87–97, Pulp Chemical Association (1981), the disclosures of which are incorporated herein by reference, in their entirety.

Processes for the distillation of tall oil to obtain the non-distillable fraction, that is, the tall oil pitch employed in the present invention, are also well known in the art, and are described, for example, in Sisson et al., U.S. Pat. No. 2,894,880, the disclosures of which are incorporated herein by reference, in their entirety. Tall oil pitch is also described in detail in *Kirk-Othmer Encyclopedia of Chemical Technology*. H. Mark, J. McKetter and D. Othmer, eds., Vol. 19, pp. 614–619 (2nd ed. 1969), Era et al., *J. Amer. Oil Chem. Soc.*, Vol. 56, pp. 992–994 (1979), Holmbom et al., *J. Amer. Oil Chem. Soc.*, Vol. 55, pp. 342–344 (1978), Speck, U.S. Pat. No. 3,238,164, D'Agostino, U.S. Pat. No. 3,445,409, and Szita, U.S. Pat. No. 4,337,193, the disclosures of each of which are incorporated herein by reference, in their entirety. In a preferred embodiment, the tall oil pitch employed in the present invention contains less than about 0.1% ash.

"Neutrals", as employed herein with respect to the present invention, denotes those compounds found in the tall oil pitch which exhibit no acid number. A suitable test for acid number is described by American Oil Chemists Society Method No. Cd 39-63. Preferably the neutrals-containing component of tall oil pitch employed in the process of the present invention consists of essentially pure neutrals. Processes for the removal of neutrals from tall oil pitch are well known in the art. Such processes are described, for example, in Holmbom et al., (ibid.). Typically, a simple water extraction procedure, as described in Example 1 herein, is employed.

Although the reactivity of tall oil pitch or neutrals with cyclopentadienes occurs over the broad range of possible pitch to cyclopentadiene ratios, preferably, the reactants are blended in ratios ranging from about 90% to 10%, pitch to cyclopentadiene. When about 90% tall oil pitch is used, the cyclopentadienes harden the pitch, making it particularly useful as a binder in printing ink. When about 10% pitch is used, the tall oil pitch moderates the reaction with the cyclopentadienes so as to produce a high melting homogeneous resin which is more soluble in aliphatic hydrocarbon resins than the 100% cyclopentadiene resins polymerized to equal softening points.

In carrying out the processes of the invention, the tall oil pitch and cyclopentadienes are combined using any one of a variety of conventional procedures. In a preferred mode of operation, the pitch is first melted to a viscosity of about 10 poise at 100° C., and cyclopentadienes are added gradually, with agitation, in an inert environment. The resultant mixture is then heated, with agitation, to a temperature between about 200° C. and about 300° C. Preferably, the mixture is heated to a temperature between about 250° C. and about 280° C. Continued agitation during the course of the reaction is preferred, although not essential. The use of long heat-up times to achieve the preselected temperature have no effect on the product obtained from the reaction. However, if the mixture contains greater than about 70% by weight dicyclopentadiene or other dimers, codimers or oligomers of substituted and unsubstituted cyclopentadiene, based on the total weight of the tall oil pitch and dicyclopentadiene and other dimers, codimers or oligomers of substituted and unsubstituted cyclopentadiene, a large exotherm arising from the cracking of these components to monomer may be observed. External cooling may be used to control the temperature of such rich mixtures and/or they may also be pre-diluted with some inert solvent such as xylene.

A distinct advantage in the use of tall oil pitch in the present process occurs in that virtually 100% of the tall oil pitch contributes to resin formation. Moreover, it should be noted that where 30% or more tall oil pitch is used, or heat-up times greater than 6 hours are employed, no inert solvent is needed to control the reaction. Avoiding the use of a solvent serves to increase reaction yield, since there is no inert solvent present to occupy the reaction volume.

As has been noted, the processes of the present invention are carried out at a temperature between about 200° C. and 300° C., preferably between about 220° C. and 280° C. It should also be noted that along this temperature continuum, end products having somewhat different physical properties may be observed. The lower processing temperatures of 200° C. to 270° C., for example, with a preferred holding temperature of about 250° C., will produce a final resin having a lower softening point and lower acid number than at the higher temperatures. Almost all of the free carboxylic acids in the tall oil pitch are consumed at this temperature range. The higher processing temperatures of 275° C. to 300° C., with a preferred holding temperature of about 280° C., will produce a final resin having a higher softening point and higher acid number than temperatures at the lower end of the range.

The process of the invention should be carried out at a pressure sufficient to maintain the reactants in liquid phase. Typical pressures range from about 35 to about 190 psi.

In carrying out the process of the present invention, the selected temperature should be maintained for a period of time from three to six hours to enable the reaction to proceed to completion. The reactor is then cooled to about 200° C., and steam stripped until a constant ring and ball softening point is obtained for the end product. During this treatment, steam stripped oils are collected in the receiver and the softening point of the end product typically advances by about 10° C. to about 80° C. above that of the unstripped product. Preferably, the product is then dried by sparging with inert gas for about 0.5 hours to remove any remaining moisture.

At this point, the product may be discharged onto a flaker belt. The steam stripped resin possesses good solubility in hydrocarbon solvents, both the high and low boiling solvents of the type used in coatings, rotogravure and offset printing ink, particularly where 40% or more tall oil pitch has been used. Where less than 40% tall oil pitch has been used in the process, the steam stripped resin will have more aliphatic and hydrocarbon solubility than would have been observed in pure cyclopentadienes resin at the same softening point.

As those skilled in the art will recognize based on the present disclosure, the resins produced in accordance with the invention are highly useful additives in inks and coatings, providing highly effective binders in such applications. The appropriate amount of resins to be used in such applications will be dependent upon the particular application, i.e., as coatings, rotogravure inks, offset printing inks, etc., and will be readily ascertainable by the artisan skilled in this area of technology.

The present invention is further described in the following Examples. These Examples are not to be construed as limiting the scope of the appended Claims.

EXAMPLE 1

Aqueous potassium hydroxide was added to 350 g of tall oil pitch (Unitol DP-6 TM, having an acid number of 58 mg KOH/g). Specifically, the Unitol DP-6 TM employed as the tall oil pitch has the following analysis: acid number, 58; color 50% in toluene, 14 (Gardner); ring and ball softening point, 31° C.; ash content, less than 0.1%.

The mixture was then diluted with toluene and diethyl ether, and washed with distilled water until the water extracted contained less than about 1.0% non-volatile solids. The ether was then evaporated on a steam bath and the residue dried in a vacuum oven to constant weight.

The dried neutrals obtained after water extraction were dissolved in dicyclopentadiene (Dicyclopentadiene Concentrate (Inhibited) TM, described previously), to provide a solution which contained about 34.6% dried neutrals and about 65.4% Dicyclopentadiene Concentrate (Inhibited) TM. This solution was charged in an autoclave, purged with nitrogen gas and heated to 275° C., at which temperature it attained an autogenic pressure of 190 psi. After two hours, the pressure dropped to 160 psi, at which time the reactor was cooled, vented and discharged. A dark resin was obtained in 87% yield having a ring and ball softening point of 205° C., as measured with a Mettler FP800 Thermo System, Mettler Instrument Company.

The dried neutrals as well as the reaction product of the neutrals and dicyclopentadiene were analyzed by gas chromatography. The analysis revealed that 32% of the dried neutrals volatilized through the column and that the volatile fraction contained twelve principal components (not counting the internal standard) which comprised 68% of all of the volatiles. The gas chromatogram of the reaction product displayed a much lower volatile throughput comprising only about 9% of the reaction product. Eight of the principal components present in the original neutral volatiles were absent. One major component of the neutrals, stigmastadiene, had been reduced from about 5.7% to about 1.0% of the total material, a reduction of almost 85%. The results are shown in Table I.

This Example demonstrates that the neutrals present in tall oil pitch react with the dicyclopentadiene to form resins.

TABLE I

| Analysis By Gas Chromatography | | | |
|---|---|---|---|
| Neutrals | | Product of Neutrals and Dicyclopentadiene Reaction | |
| Retention Time of Peak (Minutes) | % | Retention Time of Peak (Minutes) | % |
| 12.979 | reference | 12.931 | reference |
| 20.048 | 0.8069 | absent | |
| 20.510 | 2.2946 | absent | |
| 21.530 | 1.1211 | absent | |
| 21.982 | 0.3786 | 21.894 | 0.2137 |
| 23.201 | 0.7087 | absent | |
| 25.331 | 0.4894 | absent | |
| 29.305 | 1.9000 | absent | |
| 33.048 | 2.4341 | absent | |
| 35.192 | 1.3091 | absent | |
| 36.145 | 2.7400 | 36.135 | 1.4477 |
| 37.156* | 5.6531 | 37.089* | 0.9996* |
| 42.847 | 1.7758 | 42.766 | 0.3344 |
| TOTAL | 21.7307 | | 2.9954 |

*stigmastadiene

EXAMPLE 2

Approximately 1800 g of tall oil pitch (Unitol DCP-6 TM, having an acid number of 75 mg KOH/g), was mixed with approximately 1800 g of dicyclopentadiene (97%), and the mixture heated isometrically under nitrogen in a autoclave to about 166° C. The reactor was then bled to atmospheric pressure, re-sealed and heated at about 280° C. for about three hours. A maximum pressure of 35 psi was observed at 195° C. during heating to 280° C. The reaction was held at 280° C. for three hours, during which time it maintained a constant pressure of 30 psi. The reaction was then cooled to 150° C., and the reaction contents discharged.

The resulting product was then tested and found to possess the following properties:

| Acid number (mg KOH/g) | 13 |
|---|---|
| Ring and ball softening point | 108° C. |
| Viscosity at 75% in toluene (Gardner) | Z-1 |

The resin was then evaluated in drying oils and drying oil derivatives. The results of this evaluation are shown in Table II.

TABLE II

| Test | Mineral Spirits | Example Resin | Compatibility of Resin in Drying Oils and Drying Oil Derivatives | | | | Dry Film on Glass |
|---|---|---|---|---|---|---|---|
| | | | Alkalic Ref. Linseed | Z-3 Kettle Bodied | Z-3 Dehydrated Castor | Iso Res No. 7* | |
| 1 | 20 g | 10 g | 10 g | — | — | — | clear, compatible becomes tough and mar resistant |
| 2 | 15 g | 10 g | 5 g | — | — | — | clear, compatible becomes tough and mar resistant |
| 3 | 40 g | 10 g | — | 30 g | — | — | incompatible |
| 4 | 20 g | 10 g | — | 10 g | — | — | compatible |
| 5 | 40 g | 30 g | — | 10 g | — | — | compatible, dry in six hours, tough and flexible after 30 days |
| 6 | 40 g | 10 g | — | — | 30 g | — | incompatible |
| 1 | 20 g | 10 g | 10 g | — | — | — | clear, compatible becomes tough and mar resistant |
| 7 | 20 g | 10 g | — | — | 10 g | — | compatible |
| 8 | 40 g | 30 g | — | — | 10 g | — | slightly hazy film becoming tough and flexible |
| 9 | 40 g | 10 g | — | — | — | 30 g | clear, compatible |
| 10 | 20 g | 10 g | — | — | — | 10 g | compatible becoming tough and flexible |
| 11 | 40 g | 30 g | — | — | — | 10 g | compatible, dry in six hours |

*Long Linseed Oil Isophthalic Alkyd. 100% Non-volatile Solids.

EXAMPLE 3

Approximately 1800 g of tall oil pitch (Unitol DP-6 TM, having an acid number of 77 mg KOH/g) was reacted with approximately 1800 g of dicyclopentadiene (97%) under the same conditions as in Example 2. The resulting product had a ring and ball softening point of 100° C. and an acid number of 11 mg KOH/g. The product was then steam stripped at 250° C. until less than 1.0% oil was being obtained per 100 ml of water condensate.

A total of 15% heavy oil was collected based on the original charge. The oil had an acid number of less than 1 and was heavier than water. The final resin had a ring and ball softening point of 119° C. and an acid number of 14 mg KOH/g.

The oxygen absorption of this resin was determined by subjecting 1.0 gram of pulverized resin samples to an oxygen atmosphere of 300 psi at 25° C. for 7 days. After this treatment, the sample had gained an average of 0.32% weight.

COMPARATIVE EXAMPLE 4

An autoclave was charged with 3600 g of Resin Intermediate RI-300 TM supplied by Texmark Resins, Inc., a mixture of dicyclopentadiene, methyldicyclopentadiene, C5 olefins and the dimers and codimers of these constituents. RI 300 TM has an iodine number Of 290 as determined by ASTM-D-1959. The mixture was heated isometrically to 260° C., held for 16 hours at that temperature, then vented and steam stripped at 260° C.

A yield of 80% resin showing a ring and ball softening point of 81° C. was obtained. The oxygen absorption of the resin was determined using the same method as in Example 3, and the sample was found to gain an average of 8.0% weight.

This Example illustrates that the thermal copolymerization of distilled tall oil pitch with 97% dicyclopentadiene monomer (Example 3) produces a resin which is far less subject to oxidation than a resin produced by the thermal polymerization of a mixture of monomers which are principally dicyclopentadiene methyldicyclopentadiene and C5 olefins (Comparative Example 4).

EXAMPLE 5

Approximately 1230 g of tall oil pitch (Unitol DP-6 TM, having an acid number of 60 mg KOH/g) was mixed with approximately 1230 g of dicyclopentadiene (97%), and the mixture heated under nitrogen to 166° C. in an autoclave. The reactor was bled to atmospheric pressure, then re-sealed and heated isometrically to 280° C. The temperature of 280° C. was maintained for four hours. The reaction was then cooled to 150° C., and reactor contents discharged without steam stripping.

The resulting product was then tested and found to possess the following properties:

| | |
|---|---|
| Acid number (mg KOH/g) | 9 |
| Ring and ball softening point | 102° C. |
| Viscosity 50% in Magiesol 47 TM [1] | T (Gardner) |
| Magiesol 47 TM tolerance[2] | 426% |

[1]Magiesol 47 TM; a hydrotreated petroleum oil, boiling point 240° C. to 274° C.; obtained from Magie Brothers Oil Company.
[2]Ten grams of resin accepted 42.6 g of Magiesol 47 TM to develop a cloud.

This Example illustrates an unstripped distilled pitch-dicyclopentadiene resin prepared by starting with a 60 acid number tall oil pitch.

EXAMPLE 6

In a steel autoclave, 1000 g of Unitol DP-6 TM were dissolved into 1500 g of Dicyclopentadiene Concentrate (Inhibited) TM. The autoclave was sealed, purged with nitrogen then heated to 166° C. where it had an autogenic pressure of 20 psi. The reaction was bled until the atmospheric pressure returned. The batch was then heated to 280° C., held for five hours at that temperature, cooled to 220° C. and again bled to atmospheric pressure. The resultant product was then steam stripped until a ring and ball softening point of 144° C. was attained. The reactor was discharged at 200° C. to yield 2150 g of clear resin having the following properties:

| | |
|---|---|
| Acid number (mg KOH/g) | 12 |
| Ring and ball softening point (without steam stripping) | 113° C. |
| Ring and ball softening point (steam stripped) | 144° C. |
| Color 5% in toluene | 14 (Gardner) |
| Gardner tube viscosity at 50% in Magiesol 47 TM [1] | Z |
| Magiesol 47 TM reducibility (M47/Resin × 100) | 400% |

[1] Magiesol 47 TM; a hydrotreated petroleum oil, boiling point 240° C. to 274° C.; obtained from Magie Brothers Oil Company.

The Unitol DP-6 TM used in this example had an ash content of less than 0.1% and an acid number of 85. Thus, this is an Example of the use of a low ash pitch having a high acid number.

EXAMPLE 7

This Example illustrates the preparation of a web off-set heat set ink.

A. Preparation of Gel Varnish

The following ingredients were gathered together:

| | |
|---|---|
| UNI-REZ 4120 TM | 105 g |
| UNI-REZ 9014 TM | 30 g |
| Iso Rez #7 TM | 54 g |
| Magiesol 47 TM | 60 g |
| AIE-M TM /Magiesol 47 TM (ratio ⅓) | 12 g |
| Magiesol 47 TM | 39 g |
| TOTAL | 300 g |

The first four of these ingredients were until melted, thoroughly mixed, and then heated to a temperature of about 185° C. and held at that temperature until each ingredient was completely dissolved. The mixture was then cooked to 150° C., held at that temperature for about 0.5 hour, and the AIE-M TM /Magiesol 47 TM premix was added. The mixture was held an additional 15 minutes at 150° C., with agitation. The mixture was then cooled to 100° C. and Magiesol 47 TM was added as needed, to attain a one minute tack value of 18 g-meters as measured with an electric inkometer set at 400 RPM, 90° F. Additional Magiesol 47 TM (39 g) provided the necessary adjustment. The varnish was retained for use in the Test Ink Formulations (below).

B. Preparation of "LetDown" Varnish

The following ingredients were gathered together:

| | Varnish I (control) | Varnish II |
|---|---|---|
| LX-1082 TM | 141 g | |
| Example 6 | | 141 g |
| Iso Rez #7 TM | 18 g | 18 g |
| Magiesol 47 TM | 60 g | 60 g |
| Magiesol 47 TM | 26 g | 39 g |
| TOTAL | 245 g | 258 g |

The first four of these ingredients were well mixed, then heated to 185° C., followed by cooling to 150° C. The temperature of 150° C. was maintained until all ingredients were thoroughly dissolved. The batch was cooled to 100° C. and held at that temperature, with agitation, while adjusting the tack value as described above. LetDown Varnish I required 26 g of Magiesol 47 TM and LetDown Varnish II required 39 g Magiesol 47 TM to achieve one minute tack values of 18 g-meters.

C. Preparation of Test Inks

The following ingredients were gathered together:

| | Ink I (control) | Ink II |
|---|---|---|
| Varnish I (control) | 32.5 g | — |
| Varnish II | — | 32.5 g |
| Gel Varnish | 32.5 g | 32.5 g |
| Lithol Rubine Pigment | 16.0 g | 16.0 g |
| Polyethylene Wax S-390Z TM | 1.0 g | 1.0 g |
| Magiesol 47 TM | 5.3 | 6.9 g |
| TOTAL | 87.3 g | 88.9 g |

The first four of these ingredients were premixed, and an aliquot corresponding to 32.5 g of test varnish was placed on a three roll mill and ground until a reading of 3 (minimum) was obtained on an N.P.I.R.I. gauge. Magiesol 47 TM was then added until a one minute tack of 6 g-meters was obtained.

These resultant inks gave the following test values:

| | Ink I (control) | Ink II |
|---|---|---|
| Magiesol 47 TM required to adjust | 15.0 g | 17.0 g |
| Falling Rod Viscosity | | |
| Unweighted rod | 53.8 sec | 52.8 sec |
| 100 g weight | 25.7 sec | 24.5 sec |
| 350 g weight | 9.6 sec | 9.3 sec |
| Viscosity (poise) | 159 | 154 |
| Yield point (dyn-cm) | 5854 | 5792 |
| Gloss 600 (%) | 41 | 45 |
| Color development | good and equal | |
| Ink Stability (mins) at 32° C., 400 RPM | 7.75 | 7.25 |
| Tack range during stability test (g-meters) | 11 to 28 | 11 to 27 |

The tack values developed in the let-down varnishes and the ink test vales observed above define good web off-set heat set inks. The results show that the resin of Example 6 is very similar to the hydrocarbon resin control in ink performance except that the pitch derived resin is somewhat better in glow development.

In the above tables in Example 7, the following items have the following meaning:

UNI-REZ 4120 TM; modified rosin ester type hard resin; supplied by the Union Camp Corporation Chemical Products Division.

UNI-REZ 9014 TM; rosin-modified phenolic; supplied by the Union Camp Corporation Chemical Products Division.

Iso Rez #7 TM; 100% non-volatile long linseed oil isophthalic alkyd; obtained from Degen Oil Company.

Magiesol 47 TM; a hydrotreated petroleum oil, boiling point 240° C. to 274° C.; obtained from Magie Brother Oil Company.

AIE-M TM; aluminum disopropoxide acetoacetic ester chelate; 9.8% Al; obtained from Chattem Chemicals.

LX 1082 TM; hydrocarbon resin obtained from Neville Chemical Company.

Polyethylene Wax S-390 C ™ from Shamrock Chemical Corporation.

EXAMPLE 8

In a steel autoclave 1000 g of Unitol DP-6 ™ and 1500 g of dicyclopentadiene were reacted as in Example 6. The heat up and processing time was identical to Example 6 except that the batch was maintained at only 250° C. for 5 hours. The batch was then cooled and poured up to give a resin of the following properties:

| | |
|---|---|
| Ring and ball softening point (unstripped) | 33° C. |
| Final acid number (mg KOH/g) | 3 |
| Observed yield | 93% |

This is an example of thermal polymerization at 250° C. rather then 280° C.

What is claimed is:

1. A process for the preparation of resin comprising reacting cyclopentadienes with tall oil pitch or a neutrals-containing component thereof at a temperature between about 200° C. and about 300° C.

2. A process according to claim 1 wherein the cyclopentadienes comprise a mixture of dicyclopentadiene and other cyclopentadienes and hydrocarbons wherein the dicyclopentadiene comprises at least 70% by weight of said mixture.

3. A process according to claim 1 wherein the cyclopentadienes are reacted with tall oil pitch.

4. A process according to claim 3 wherein the tall oil pitch comprises less than about 0.1% ash.

5. A process according to claim 1 wherein the cyclopentadienes are reacted with a neutrals-containing component of tall oil pitch.

6. A process according to claim 5 wherein the neutrals-containing component consists of essentially pure neutrals.

7. A process according to claim 1 wherein the temperature is between about 220° C. and 280° C.

8. A process according to claim 7 wherein the temperature is about 250° C.

9. A process according to claim 7 wherein the temperature is about 280° C.

10. A resin prepared in accordance with the process of claim 1.

11. An ink for use in offset printing containing a resin prepared in accordance with the process of claim 1.

12. A coating composition containing a resin prepared in accordance with claim 1.

* * * * *